(12) United States Patent
Krishnamurthy et al.

(10) Patent No.: US 10,615,730 B2
(45) Date of Patent: Apr. 7, 2020

(54) METHOD FOR RELIABLE CONTROL OF HIGH ROTOR POLE SWITCHED RELUCTANCE MACHINE

(71) Applicant: Software Motor Company, Sunnyvale, CA (US)

(72) Inventors: Mahesh Krishnamurthy, Wheaton, IL (US); Trevor Creary, San Jose, CA (US)

(73) Assignee: Software Motor Company, Sunnyvale, CA (US)

( * ) Notice: Subject to any disclaimer, the term of this patent is extended or adjusted under 35 U.S.C. 154(b) by 0 days.

(21) Appl. No.: 16/675,653

(22) Filed: Nov. 6, 2019

(65) Prior Publication Data
US 2020/0076344 A1    Mar. 5, 2020

Related U.S. Application Data

(63) Continuation of application No. 16/119,725, filed on Aug. 31, 2018, now Pat. No. 10,483,896, which is a continuation of application No. 15/800,396, filed on Nov. 1, 2017, now Pat. No. 10,069,449, which is a continuation of application No. 15/413,007, filed on Jan. 23, 2017, now Pat. No. 9,813,006, which is a continuation-in-part of application No. 15/016,084, filed on Feb. 4, 2016, now Pat. No. 9,553,538.

(60) Provisional application No. 62/111,781, filed on Feb. 4, 2015.

(51) Int. Cl.
*H02P 25/08* (2016.01)
*H02P 25/089* (2016.01)
*H02P 6/18* (2016.01)
*H02P 6/185* (2016.01)

(52) U.S. Cl.
CPC ........... *H02P 25/089* (2016.02); *H02P 6/185* (2013.01); *H02P 6/186* (2013.01)

(58) Field of Classification Search
CPC .............................. H02P 25/089; H02P 6/185
USPC ...................................................... 318/254.1
See application file for complete search history.

(56) References Cited

U.S. PATENT DOCUMENTS

| | | | |
|---|---|---|---|
| 2010/0060210 A1* | 3/2010 | Liu | H02P 21/14 318/400.02 |
| 2016/0056741 A1* | 2/2016 | Lovas | H02P 6/185 318/400.21 |

* cited by examiner

*Primary Examiner* — Erick D Glass
(74) *Attorney, Agent, or Firm* — Temmerman Law; Mathew J. Temmerman

(57) ABSTRACT

A system and method for reliable control of a high rotor pole switched reluctance machine (HRSRM) utilizing a sensorless reliable control system. The method comprising: energizing at least one of the plurality of stator phases; measuring a first current value and time taken by the first current value to reach a first peak value or preset threshold value of current; determining a self-inductance value; measuring a second current value and time taken by an adjacent un-energized stator phase to reach a second peak value of current; determining a mutual inductance value; and estimating a rotor position utilizing the self-inductance and mutual inductance values; and controlling the HRSRM based on the estimated rotor position.

20 Claims, 7 Drawing Sheets

METHOD FOR RELIABLE CONTROL OF HIGH ROTOR POLE SWITCHED RELUCTANCE MACHINE

RELATED APPLICATIONS

This application is a Continuation Application of U.S. patent application Ser. No. 16/119,725. Filed Aug. 31, 2018, now U.S. Pat. No. 10,483,896 granted Nov. 19, 2019, and which is a Continuation Application of U.S. patent application Ser. No. 15/800,396 filed Nov. 1, 2017, now U.S. Pat. No. 10,069,449 granted Sep. 4, 2018, which is a Continuation Application of U.S. patent application Ser. No. 15/413,007 filed Jan. 23, 2017, now U.S. Pat. No. 9,813,006 granted Nov. 7, 2017, which is a continuation in part of U.S. patent application Ser. No. 15/016,084 filed Feb. 4, 2016, now U.S. Pat. No. 9,553,538 granted Jan. 24, 2017, and which claims priority from the United States provisional application with Ser. No. 62/111,781, was filed on Feb. 4, 2015. These applications are incorporated herein by reference as if set out in full.

BACKGROUND OF THE DISCLOSURE

Technical Field of the Disclosure

The present disclosure relates in general to reliable control of high rotor pole switched reluctance machine (HRSRM), and more particularly to a system and method for eliminating the use of position sensors in HRSRM which improve the accuracy of rotor position estimation utilizing a combination of self-inductance and mutual-inductance values.

Description of the Related Art

A wide variety of methods have been developed to provide optimal control strategies for switched reluctance machines (SRMs). Compared to conventional induction and synchronous motor drive systems, SRM drives are relatively simple in construction, offer wide speed range capabilities and are economic to manufacture. Further, because of the absence of windings and permanent magnets on the rotor they are attractive for robust and harsh environment applications. In addition, the converter, which applies power to the SRM drive, often requires fewer power devices and, therefore, is more economical and reliable. Building on these advantages, SRM drive systems provide an advanced alternative to conventional drive systems in several variable speed drive and industrial applications. SRM drives conventionally have multiple poles on both the stator and rotor. The stator includes phase windings, but the rotor does not include windings or magnets.

In an SRM system, the stator generates torque on the rotor when the current passing through each phase winding is switched on in a predetermined sequence. By properly positioning the firing pulses relative to the rotor angle, forward or reverse operations may be obtained. Usually, the desired phase current commutation is achieved by feeding back a rotor position signal to a controller from a shaft position sensor, e.g., an encoder or resolver. For economic reasons in small drives and reliability reasons in larger drives and to reduce size, weight, and inertia in all such drives, it is desirable to eliminate this shaft position sensor. In order to overcome this shortcoming, a new sensorless technique for high rotor pole switched reluctance machine (HRSRM) has been introduced.

Compared to a conventional SRM, the HRSRM exhibits higher static torque capabilities, which effectively addresses torque ripple and acoustic noise problems. The design parameters of the power converters are different in HRSRMs vs. HRMs. This is because the HRSRM has a different inductance profile and a higher number of strokes. Most reliable techniques for conventional HRSRM operation utilize the self-inductance of the phase coil to estimate position. The HRSRM has a higher number of rotor poles for the same circumference as a conventional SRM. The higher number of rotor poles reduces the angular travel per excitation. HRSRM has shown an approximate increase of 83% in static torque capabilities as compared to a 6/4 SRM under steady state operations for the same joule losses. However, the larger number of rotor poles leads to a smaller gap and the arc length (or angular length) between two rotor poles is smaller. Consequently, unaligned inductance of the machine is lower and the resultant the self-inductance profile for the HRSRM tends to become flatter, which leads to unreliable position estimations. Thus, the use of self-inductance of the phase coil alone is often not sufficient to estimate the accurate rotor position in the HRSRM.

Several methods have been developed to solve the above shortcomings. One of the existing reliable control methods includes a technique for measuring mutual inductance. In a first example embodiment of this technique, a voltage pulse is applied to the primary coil when the machine is stationary. By measuring current in the primary coil and measuring induced voltages in adjacent open circuited coils, mutual inductance may be determined. In another example embodiment, a voltage pulse is applied to the primary coil when the machine is stationary. The secondary coil is allowed to free-wheel current through the phase. By measuring the time taken by the primary phase to reach a peak or preset threshold value, the mutual inductance for the known position of a rotor may be determined. However, this technique usually does not provide an accurate estimation of rotor position since this method only utilizes mutual inductance for the rotor position estimation.

Some other reliable control methods include a controller that implements a model of at least one active phase representing dynamic magnetic machine characteristics. The controller determines machine control signals based on rotational position obtained by numerically solving the model with measured machine operating parameters. The model may be implemented as the sum of orthogonal functions relating active phase voltage and current with constants derived from phase inductance to obtain the rotor angle. Yet another reliable control method includes probing a selected diagnostic phase with a pulse injection process; measuring an actual operating characteristic of the SRM; computing an inductance based on the actual operating characteristic and correlating the inductance with a position to formulate an estimated position; modeling the SRM to formulate an observer-based estimated position; selecting one of the estimated positions, the observer-based estimated position, and a combination thereof to formulate a selected position of the SRM; and controlling said SRM based on said selected position and a command. However, in most of these methods, while evaluating the machine performance, the mutual inductances between phases are neglected, resulting in an unreliable position estimation. Further, these methods do not provide an accurate rotor position in a HRSRM configuration.

Therefore, there is a need for a method of reliable control of a HRSRM using a combination of self-inductance and mutual inductance to enhance the accuracy of rotor position estimation. The method would use only terminal measurements such as, voltages, currents and time and would not require additional hardware or memory. Further, the method would be able to accurately estimate instantaneous rotor position in HRSRM and SRM, irrespective of motor speed or direction, and without resorting to a rotor position sensor. Finally, the method would be reliable, robust and preferably cost effective. The present embodiment accomplishes these objectives.

SUMMARY OF THE DISCLOSURE

To minimize the limitations found in the prior art and to minimize other limitations that will be apparent upon the reading of this specification, the Applicant provides a sensorless reliable control system for a high rotor pole switched reluctance machine (HRSRM). The present reliable control system utilizes electrical parameters such as current and voltage to determine rotor position with high accuracy thereby eliminating the required use of shaft position sensors. The HRSRM includes a rotor and a stator with a plurality of stator phases each having a winding. The reliable control system includes a stator phase energizing module to excite at least one of the plurality of stator phases, wherein each of the windings of the rest of the plurality of stator phases is in an open circuit state. A first current and time measuring module measures a first current value through the at least one energized stator phase taken by the first current value to reach a first peak value of current. The system further comprises a self-inductance determining module to determine the self-inductance value for the at least one energized stator phase utilizing the first current value and time. A first storage module stores the determined self-inductance value and the first current value for each of the plurality of stator phases in a lookup table or alternatively the self-inductance and current values are stored in the form of an analytical expression such as a polynomial or Fourier expression that describes the inductance of each phase at each current value. A second current and time measuring module measures a second current value through an adjacent un-energized stator phase and the time taken by the adjacent un-energized stator phase to reach a second peak value of current wherein the winding of the adjacent stator phase is in an open circuit state. A mutual-inductance determining module determines the mutual inductance value between the at least one energized stator phase and the adjacent un-energized stator phase. A second storage module stores the mutual inductance value and the second current value for each of the plurality of stator phases in the lookup table or in the form of an analytical expression such as a polynomial or Fourier expression that describes the inductance of each phase at each current value. A rotor position estimation module estimates a rotor position utilizing a combination of the self-inductance and mutual inductance values determined at the self-inductance determining module and the mutual-inductance determining module respectively. A control module controls the HRSRM utilizing the estimated rotor position.

The preferred method provides a method for reliable control of a high rotor pole switched reluctance machine (HRSRM) utilizing the sensorless reliable control system, the method comprising: energizing at least one of the plurality of stator phases at a stator phase energizing module, wherein each of the windings of the rest of the plurality of stator phases is in an open circuit state; measuring a first current value through the at least one energized stator phase and the time taken by the first current value to reach a first peak value of current at a first current and time measuring module; determining a self-inductance value for the at least one energized stator phase at a self-inductance determining module; storing the self-inductance value and the first current value for each of the plurality of stator phases at a first storage module; measuring a second current value through an adjacent un-energized stator phase and time taken by the adjacent un-energized stator phase to reach a second peak value of current at a second current and time measuring module, wherein the winding of the adjacent un-energized stator phase is in an open circuit state; determining a mutual inductance value between the at least one energized stator phase and the adjacent un-energized stator phase at a mutual-inductance determining module; storing the mutual inductance value and the second current value for each of the plurality of stator phases at a second storage module; estimating a rotor position utilizing a combination of the stored self-inductance and mutual inductance values at a rotor position estimation module; and controlling the HRSRM based on the estimated rotor position at a control module.

In another configuration of the preferred embodiment, the mutual inductance is determined utilizing a voltage and time values. In this configuration, the reliable control system includes the stator phase energizing module to excite the at least one of the plurality of stator phases, wherein each of the windings of the rest of the plurality of stator phases is in an open circuit state. The current value through the at least one energized stator phase and time taken by the current value to reach a peak value of current are measured at a current and time measuring module. The self-inductance value for the at least one energized stator phase is determined at a self-inductance determining module. The self-inductance value and the current value for each of the plurality of stator phases are stored at the first storage module. The magnitude of voltage value across an adjacent un-energized stator phase and time taken by an adjacent un-energized stator phase to attain the voltage value are measured at a voltage and time measuring module, wherein the winding of the adjacent un-energized stator phase is in a short circuit state. The mutual inductance value between the at least one energized stator phase and the adjacent un-energized stator phase is determined at a mutual-inductance determining module. In the second storage module, the mutual inductance and the voltage value for each of the plurality of stator phases are stored. The rotor position is estimated utilizing the hybrid combination of the estimated self-inductance and mutual inductance values at the rotor position estimation module. The control module controls the HRSRM based on the estimated rotor position.

In one embodiment, the method for the above-mentioned configuration of the reliable control system comprises energizing at least one of the plurality of stator phases at a stator phase energizing module, wherein each of the windings of the rest of the plurality of stator phases is in an open circuit state; measuring a current value through the at least one energized stator phase and time taken by the current value to reach a peak value of current at a current and time measuring module; determining a self-inductance value for the at least one energized stator phase at a self-inductance determining module; storing the self-inductance value and the current value for each of the plurality of stator phases at a first storage module; measuring a voltage value across an adjacent un-energized stator phase and time taken by an adjacent un-energized stator phase to attain the voltage value at a voltage and time measuring module, wherein the winding of the adjacent un-energized stator phase is in a short circuit state; determining a mutual inductance value between the at least one energized stator phase and the adjacent un-energized stator phase at a mutual-inductance determining module; storing the mutual inductance and the voltage value for each of the plurality of stator phases at a second storage module; estimating a rotor position utilizing a combination of the stored self-inductance and mutual inductance values at a rotor position estimation module; and controlling the HRSRM based on the estimated rotor position at a control module.

A first objective of the present invention is to provide a system and method for reliable control of a HRSRM that enhances the accuracy of rotor position estimation by using a combination of self-inductance and mutual inductance values.

A second objective of the present invention is to provide a system and method for reliable control of the HRSRM that eliminates the use of a rotor position sensor and the added weight and space requirements attendant thereto.

A third objective of the present invention is to provide a method and system for the reliable control of the HRSRM that utilizes only terminal measurements such as voltages, currents and time without requiring any additional hardware.

Another objective of the present invention is to provide a method and system for reliable control of the HRSRM that is cost effective, reliable and robust.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve the understanding of the various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above, may only address one of the problems discussed above, or may address multiple problems discussed above. Further, one or more of the problems discussed above may not be fully addressed by any of the features described below.

Figure 1:
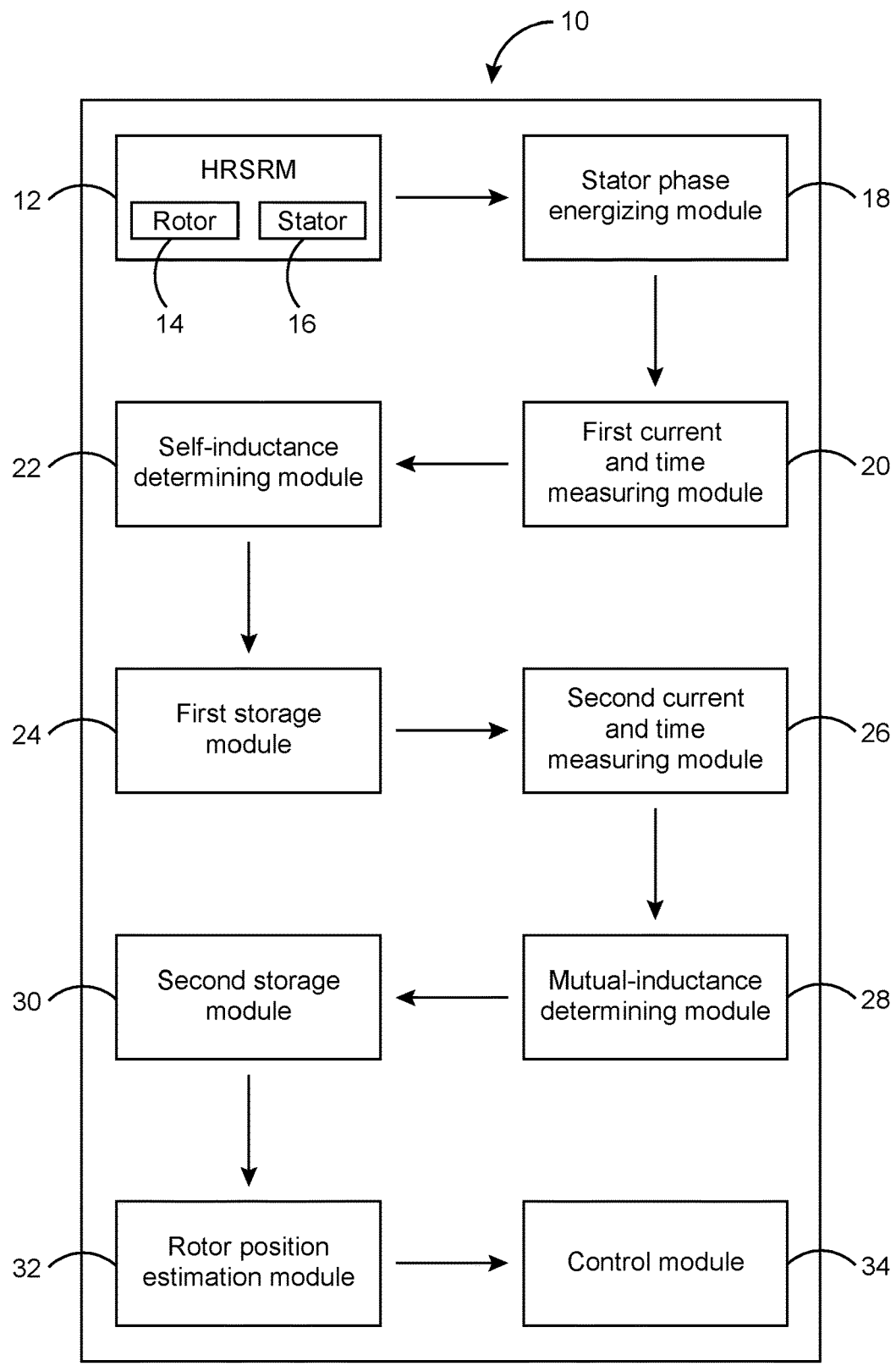
FIG. 1 illustrates a block diagram of a sensorless reliable control system for a high rotor pole switched reluctance machine (HRSRM) in accordance with one embodiment of the present invention.

The present embodiment provides a sensorless reliable control system 10 for a high rotor pole switched reluctance machine (HRSRM) 12 utilizing a hybrid combination of self-inductance and mutual inductance values as shown in FIG. 1. The HRSRM 12 includes a rotor 14 and a stator 16 with a plurality of stator phases each having a winding. The reliable control system 10 comprises a stator phase energizing module 18 to excite at least one of the plurality of stator phases, wherein each of the windings of the rest of the plurality of stator phases is in an open circuit state. A first current and time measuring module 20 measures a first current value through the at least one energized stator phase taken by the first current value to reach a first peak value of current. The system 10 further comprises a self-inductance determining module 22 to determine a self-inductance value for the at least one energized stator phase utilizing the first current value and time. A first storage module 24 stores the determined self-inductance value and the first current value for each of the plurality of stator phases in a lookup table or alternatively stored in the form of an analytical expression such as a polynomial or Fourier expression that describes the inductance of each phase at each current value. A second current and time measuring module 26 measures a second current value through an adjacent un-energized stator phase and time taken by the adjacent un-energized stator phase to reach a second peak value of current, wherein the winding of the adjacent stator phase is in an open circuit state. The system further comprises a mutual-inductance determining module 28 to determine a mutual inductance value between the at least one energized stator phase and the adjacent un-energized stator phase. A second storage module 30 stores the mutual inductance value and the second current value for each of the plurality of stator phases in the lookup table or in the form of an analytical expression (a polynomial or Fourier expression that describes the inductance of each phase at each current value). A rotor position estimation module 32 of the reliable control system 10 is designed to estimate a rotor position utilizing a combination of the self-inductance and mutual inductance values determined at the self-inductance determining module and the mutual-inductance determining module respectively. The reliable control system 10 further comprises a control module 34 to control the HRSRM utilizing the estimated rotor position.

Figure 2:
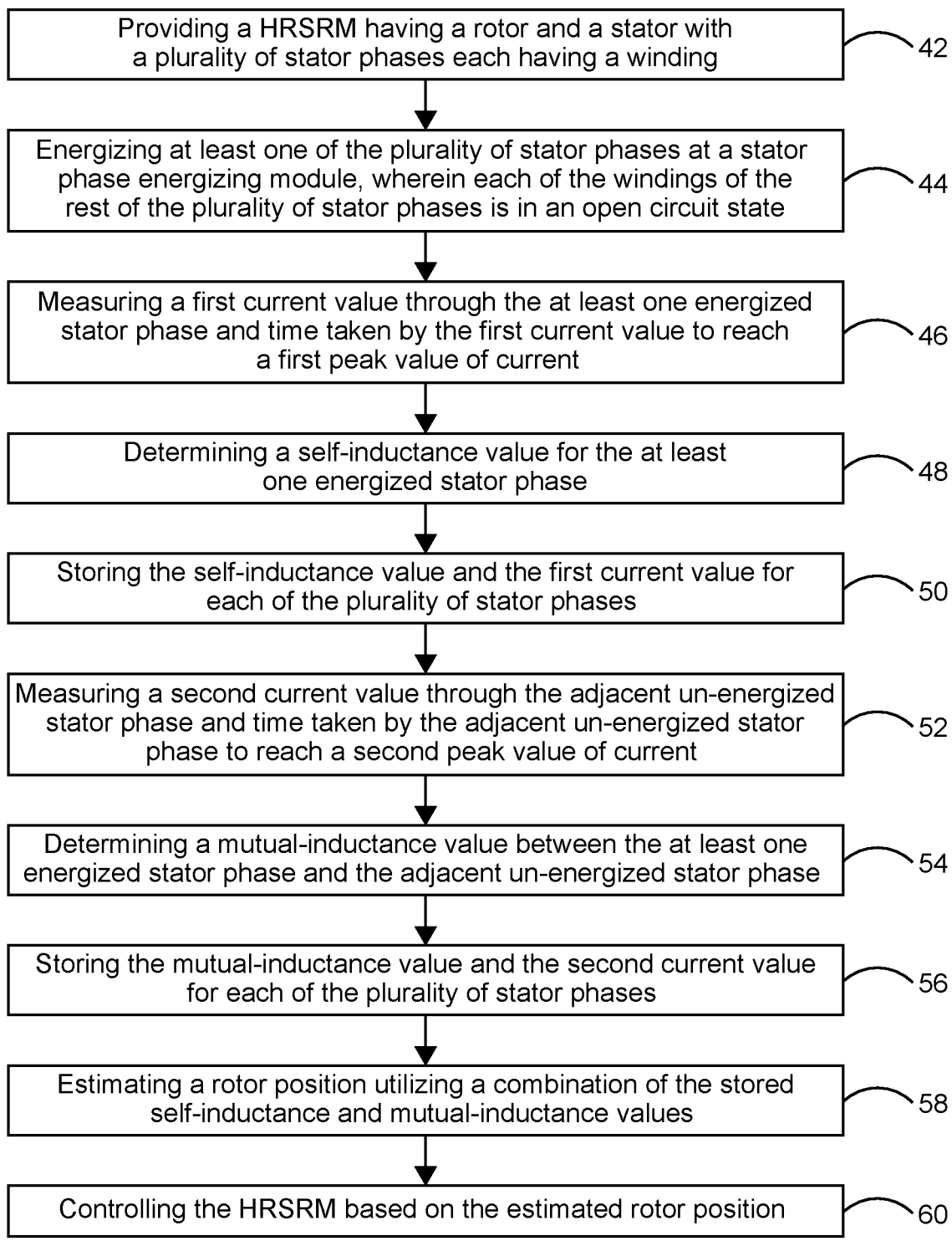
FIG. 2 illustrates a flowchart of a method for reliable control of the HRSRM utilizing the sensorless reliable control system for the HRSRM shown in FIG. 1.

FIG. 2 illustrates a flowchart of a method for reliable control of the HRSRM 12 utilizing the sensorless reliable control system 10. The method is designed to control the HRSRM with high accuracy. The preferred method commences by providing the HRSRM with the rotor and the stator as shown in block 42. The at least one of the plurality of stator phases is energized at the stator phase energizing module, wherein each of the windings of the rest of the plurality of stator phases is in the open circuit state as shown in block 44. Next, the first current value through the at least one energized stator phase and the amount of time taken by the first current value to reach the first peak value of current are determined at the first current and time measuring module as shown in block 46. Then, the self-inductance value for the at least one energized stator phase is determined at the self-inductance determining module as indicated at block 48. Thereafter, the first storage module stores the self-inductance value and the first current value for each of the plurality of stator phases in the lookup table or stores in the form of an analytical expression as shown in block 50. The second current value through the adjacent un-energized stator phase and time taken by the adjacent un-energized stator phase are measured at the second current and time measuring module as indicated at block 52, wherein the winding of the adjacent un-energized stator phase is in an open circuit state. Next, the mutual inductance value between the at least one energized stator phase and the adjacent un-energized stator phase are determined at the mutual-inductance determining module as indicated at block 54. The second storage module stores the mutual inductance value and the second current value in the lookup table or in the form of an analytical expression as shown in block 56. Thereafter, the rotor position is estimated utilizing the hybrid combination of the self-inductance and mutual inductance values at the rotor position estimation module as shown in block 58. Finally, the estimated rotor position is utilized to control the HRSRM at the control module as indicated at block 60.

Since one or more of the phase windings in this embodiment is switched off at any given time, it is possible to probe that winding with a low level signal and determine its input impedance. This information, together with the knowledge of the functional relationship between inductance and rotor position, makes it possible to determine a highly accurate angular position of the rotor 14 from electrical measurements such as voltage and current, thereby eliminating the need for a shaft position sensor.

Figure 3:
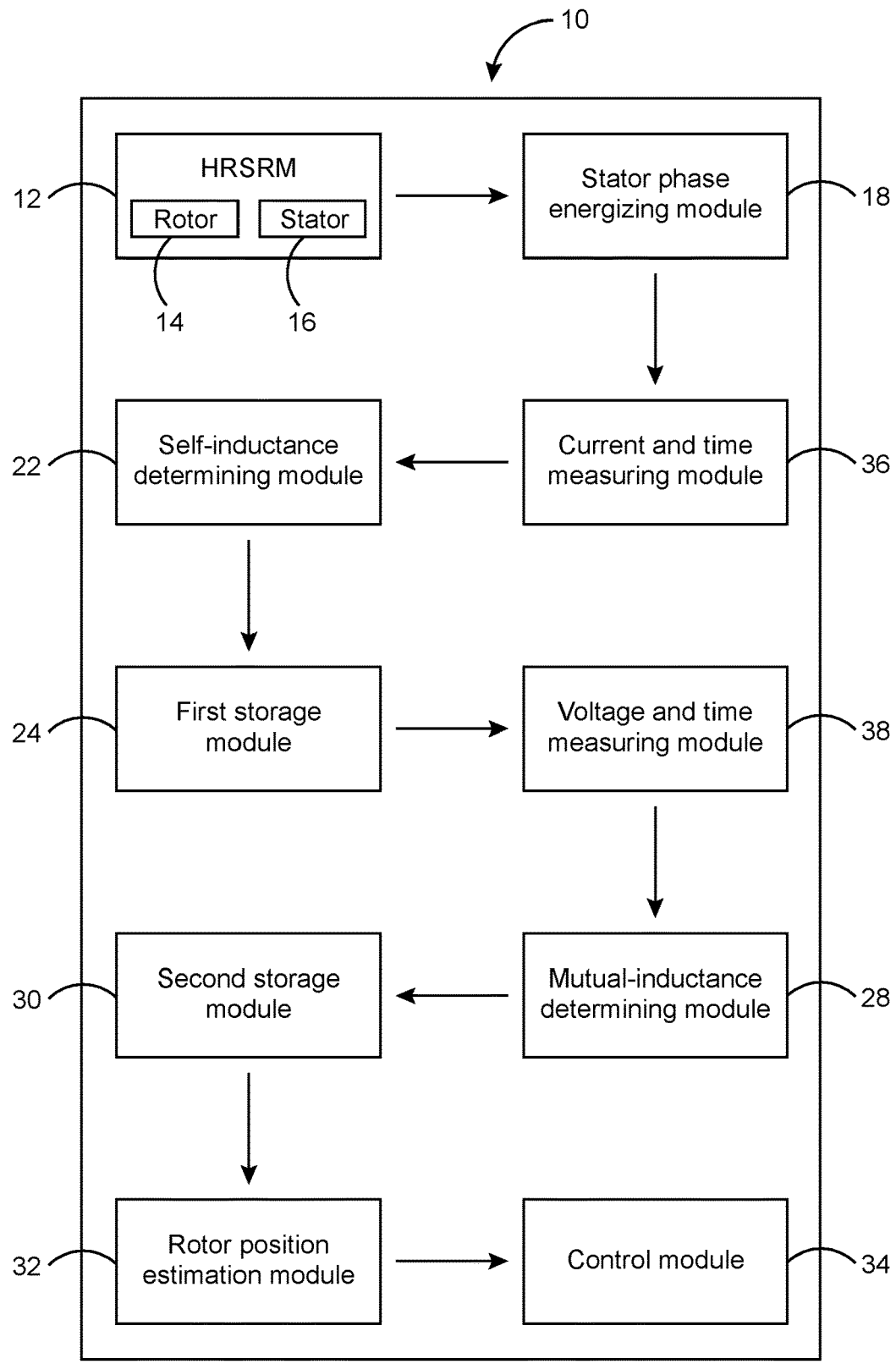
FIG. 3 illustrates a block diagram of another configuration of the sensorless reliable control system for the HRSRM in accordance with one embodiment of the present invention.

Another configuration of the preferred embodiment is shown in FIG. 3. In this configuration, the mutual inductance is determined utilizing voltage and time values. The reliable control system 10 includes the stator phase energizing module 18 to excite the at least one of the plurality of stator phases, wherein each of the windings of the rest of the plurality of stator phases is in an open circuit state. A current and time measuring module 36 measures the current value through the at least one energized stator phase and the time taken by the current value to reach the peak value of current. The self-inductance determining module 22 determines the self-inductance value for the at least one energized stator phase. The first storage module 24 stores the self-inductance value and the current value for each of the plurality of stator phases in the lookup table or in an analytic expression. A voltage and time measuring module 38 measures a voltage value across an adjacent un-energized stator phase and the time taken by the adjacent un-energized stator phase to attain the voltage value, wherein the winding of the adjacent un-energized stator phase is in a short circuit state. The mutual-inductance determining module 28 utilizes the determined voltage and time values to evaluate the mutual inductance value between the at least one energized stator phase and the adjacent un-energized stator phase. The second storage module 30 stores the mutual inductance value and the voltage value for each of the plurality of stator phases. The rotor position estimation module 32 estimates the rotor position utilizing a combination of the stored self-inductance and mutual inductance values. Based on the estimated rotor position, the control module 34 controls the HRSRM.

Figure 4:
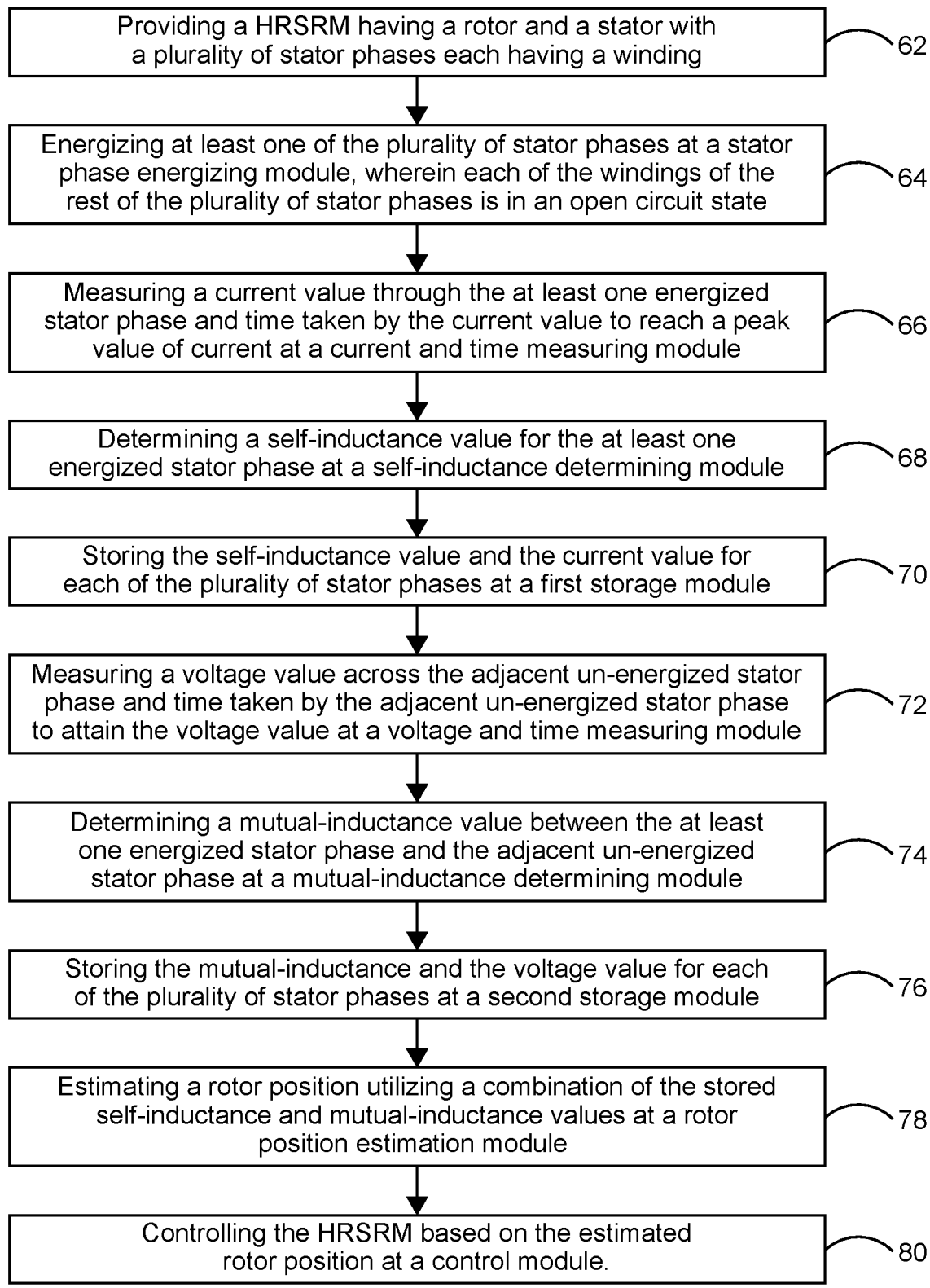
FIG. 4 illustrates a flowchart of a method for the sensorless reliable control system shown in FIG. 3.

FIG. 4 illustrates a flowchart of a method for reliable control of the HRSRM utilizing the sensorless reliable control system shown in FIG. 3. The method starts by providing a HRSRM including a rotor and a stator with a plurality of stator phases as indicated at block 62. Next, the stator phase energizing module energizes at least one of the plurality of stator phases, wherein each of the windings of the rest of the plurality of stator phases is in the open circuit state as shown in block 64. Thereafter, the current and time taken by the current value to reach the peak value of current is measured at the current and time measuring module as shown in block 66. The self-inductance determining module determines the self-inductance value for the at least one energized stator phase as shown in block 68. Next, the first storage module stores the self-inductance value and the current value for each of the plurality of stator phases in the lookup table or in the form of an analytical expression as shown in block 70. As shown in block 72, the voltage value across an adjacent un-energized stator phase and the time taken by an adjacent un-energized stator phase are measured to attain the voltage value at the voltage and time measuring module, wherein the winding of the adjacent un-energized stator phase is in the short circuit state. The mutual inductance value between the at least one energized stator phase and the adjacent un-energized stator phase is determined at the mutual-inductance determining module as indicated at block 74. Next, the mutual inductance and the voltage value for each of the plurality of stator phases are stored at the second storage module as shown in block 76. Thereafter, the rotor position is estimated utilizing the hybrid combination of the stored self-inductance and mutual inductance values at the rotor position estimation module as indicated at block 78. Finally, the estimated rotor position is utilized to control the HRSRM at the control module as shown in block 80.

During operation, any of the currently existing techniques are implemented to measure self and mutual inductance values. In an alternative embodiment, a combination of self-inductance and the back EMF from the HRSRM 12 or back EMF and mutual inductance from the HRSRM 12 are used to determine the rotor position.

Figure 5:
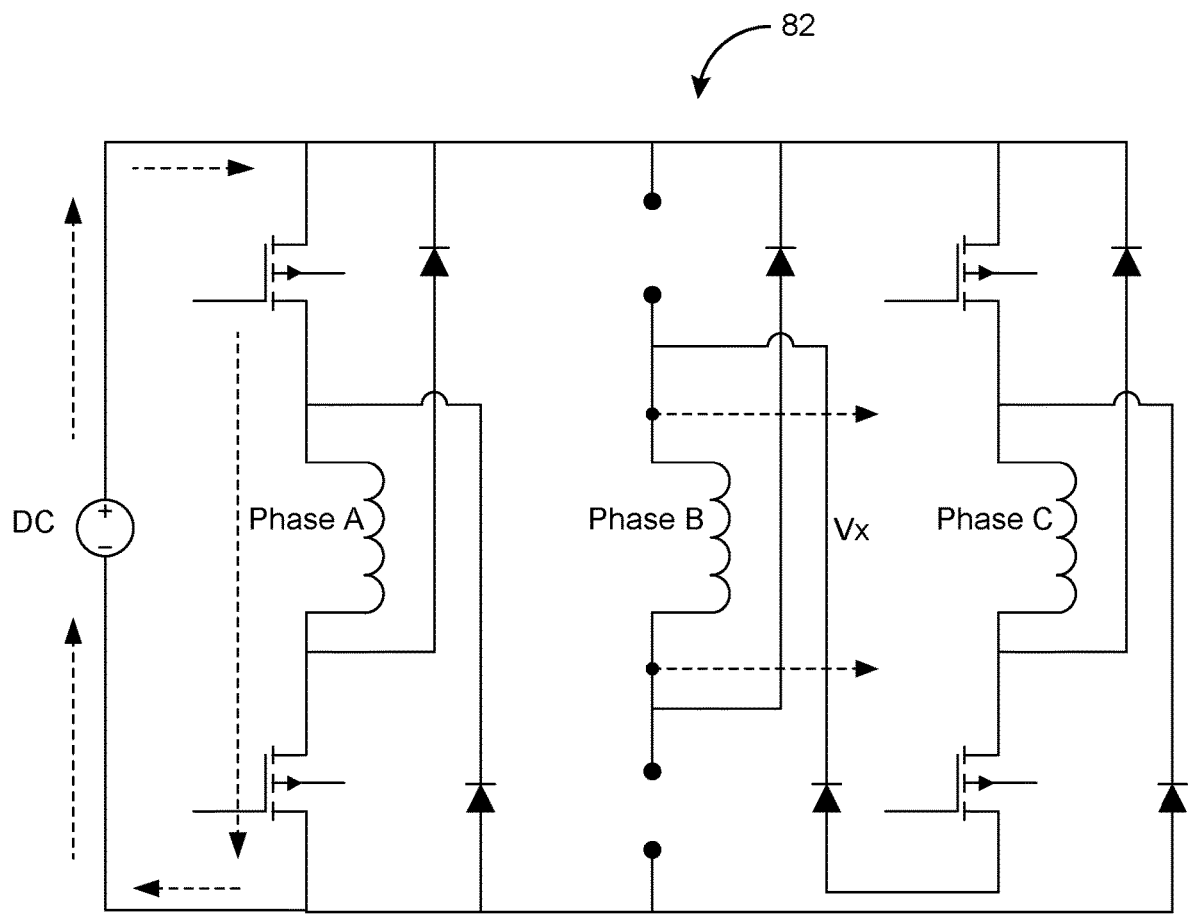
FIG. 5 illustrates a converter setup to implement the sensorless reliable control system shown in FIG. 1.

FIG. 5 is a diagrammatic converter setup 82 to implement the sensorless reliable control system 10 shown in FIG. 1. This electrical circuit arrangement measures the self-inductance for phase A and the mutual-inductance for open-circuited phase B.

Figure 6:
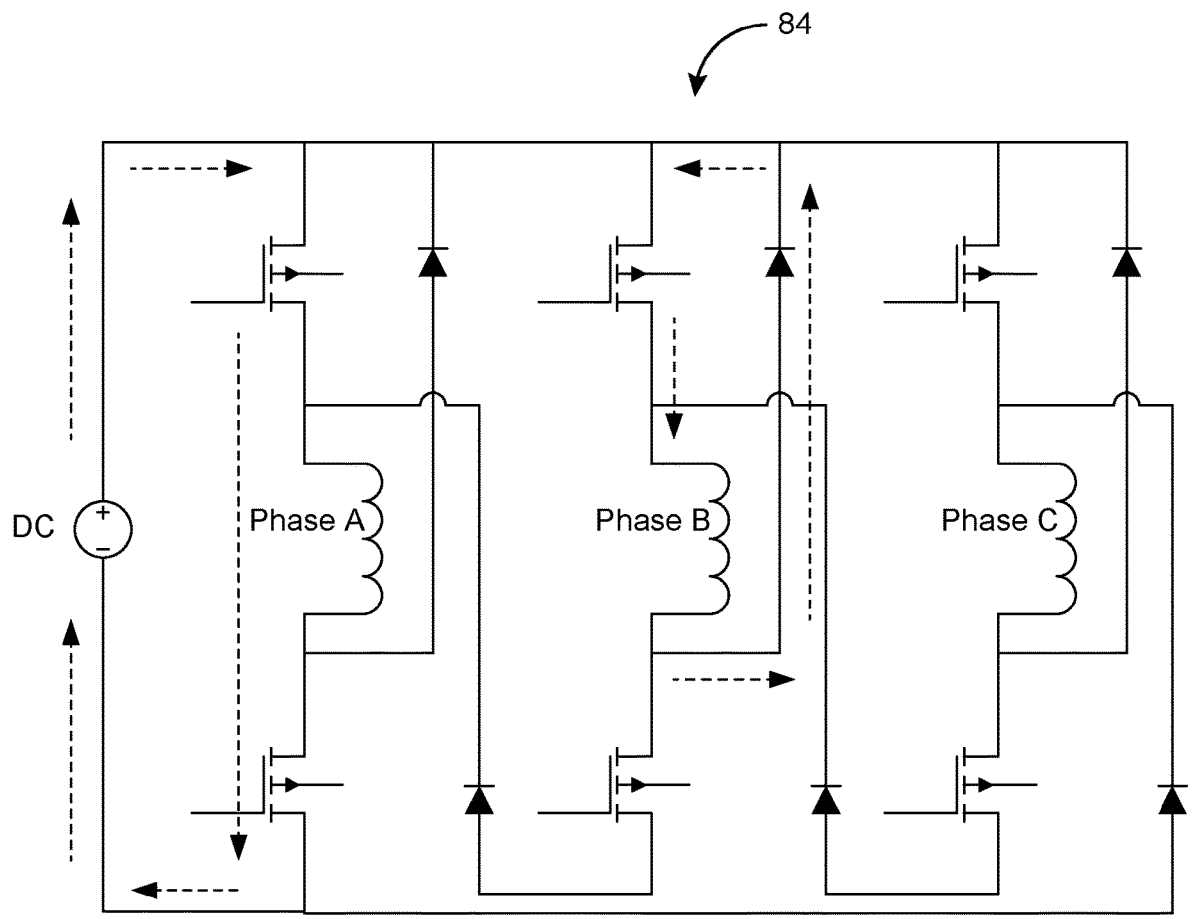
FIG. 6 illustrates a converter setup to implement the sensorless reliable control system shown in FIG. 3.

FIG. 6 is a diagrammatic converter setup 84 to implement the sensorless reliable control system 10 shown in FIG. 3. This electrical circuit arrangement measures the self-inductance for phase A and the mutual-inductance for short-circuited phase B.

Figure 7:
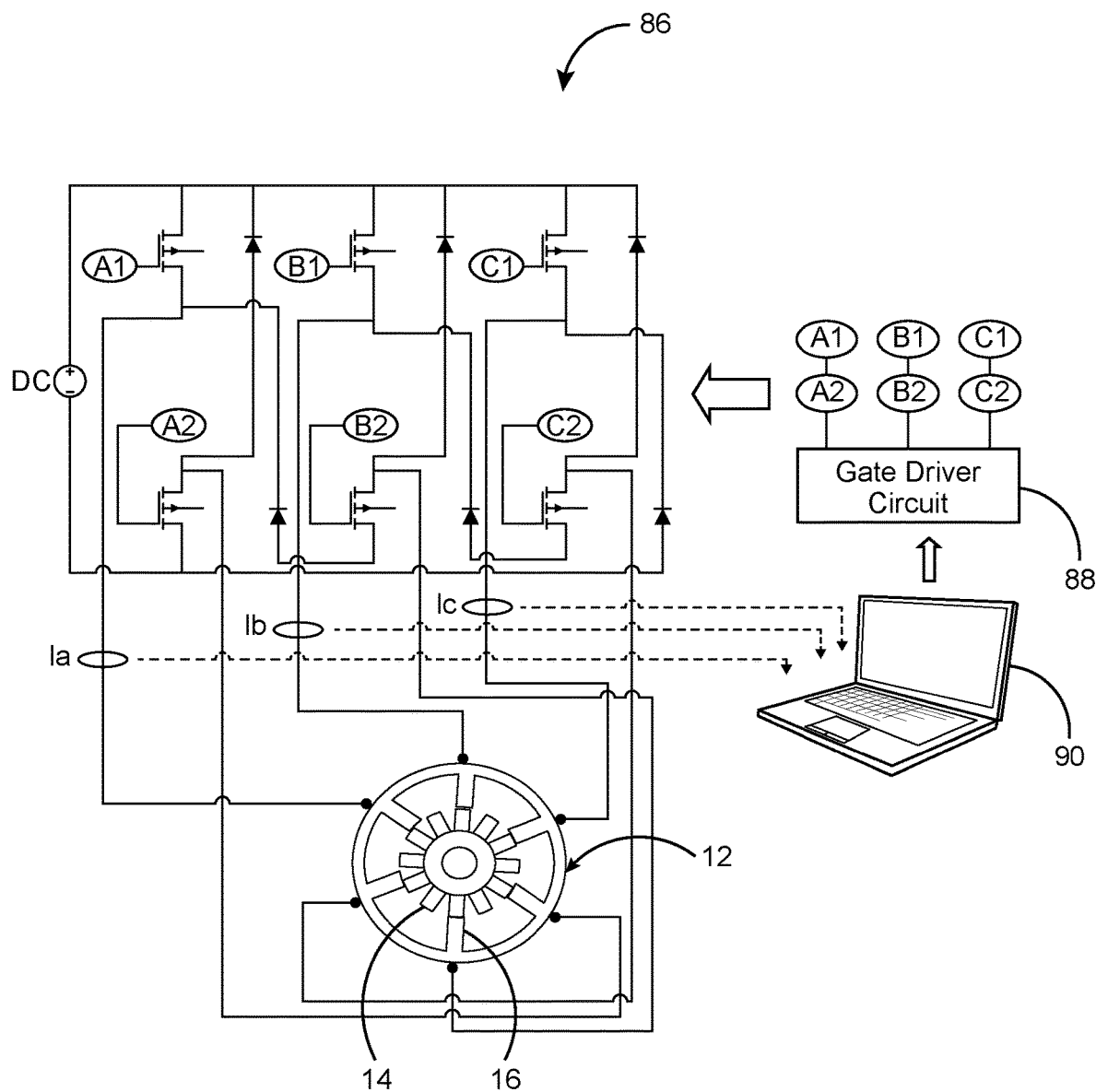
FIG. 7 illustrates a system layout for the sensorless control of the HRSRM utilizing current measurements to estimate the rotor position in accordance with one embodiment of the present invention.

FIG. 7 is a diagrammatic system layout 86 for the sensorless reliable control system 10 using current measurements to estimate the rotor position. This electrical arrangement utilizes a gate driver circuit 88 and a computer system 90 to control the electrical inputs to the plurality of stator phase windings.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A sensorless reliable control system for a high rotor pole switched reluctance machine (HRSRM) utilizing a hybrid combination of self-inductance and mutual inductance values, the reliable control system comprising:
   a stator phase energizing module to excite at least one of a plurality of stator phases each having a winding, wherein each of the windings of the rest of the plurality of stator phases is in an open circuit state;
   a current and time measuring module to measure a current value through the at least one energized stator phase and time taken by the current value to reach a peak value or preset magnitude of current;
   a self-inductance determining module to determine a self-inductance value for the at least one energized stator phase;
   a storage module to store the self-inductance value and the current value for each of the plurality of stator phases;
   a voltage and time measuring module to measure a voltage value across an adjacent un-energized stator phase and time taken by the adjacent un-energized stator phase to attain the voltage value;
   a mutual-inductance determining module to determine a mutual inductance value between the at least one energized stator phase and the adjacent un-energized stator phase;
   a rotor position estimation module to estimate a rotor position utilizing a combination of the stored self-inductance and mutual inductance values; and
   a control module to control the HRSRM based on the estimated rotor position.

2. The sensorless reliable control system of claim 1 wherein the self-inductance and the current values are stored in a lookup table at the first storage module.

3. The sensorless reliable control system of claim 1 wherein the self-inductance and the current values are stored in the form of an analytical expression at the storage module.

4. The sensorless reliable control system of claim 1 wherein the mutual-inductance and the voltage values are stored in a lookup table.

5. The sensorless reliable control system of claim 1 wherein the mutual-inductance and the voltage values are stored in the form of an analytical expression.

6. A sensorless reliable control system for a high rotor pole switched reluctance machine (HRSRM) utilizing a hybrid combination of self-inductance and mutual inductance values, the reliable control system comprising:
   a stator phase energizing module to excite at least one of a plurality of stator phases each having a winding, wherein each of the windings of the rest of the plurality of stator phases is in an open circuit state;
   a first current and time measuring module to measure a first current value through the at least one energized stator phase and time taken by the first current value to reach a first peak value of current;
   a self-inductance determining module to determine a self-inductance value for the at least one energized stator phase;
   a storage module to store the self-inductance value and the first current value for each of the plurality of stator phases;
   a current and time measuring module to measure a second current value through an adjacent un-energized stator phase and time taken by the adjacent un-energized stator phase to reach a second peak value of current;
   a mutual-inductance determining module to determine a mutual inductance value between the at least one energized stator phase and the adjacent un-energized stator phase;
   a rotor position estimation module to estimate a rotor position utilizing the hybrid combination of the stored self-inductance and mutual inductance values; and
   a control module to control the HRSRM based on the estimated rotor position.

7. The sensorless reliable control system of claim 6 wherein the self-inductance and the first current values are stored in a lookup table.

8. The sensorless reliable control system of claim 6 wherein the self-inductance and the first current values are stored in the form of an analytical expression.

9. The sensorless reliable control system of claim 6 wherein the mutual-inductance and the second current values are stored in a lookup table.

10. The sensorless reliable control system of claim 6 wherein the mutual-inductance and the second current values are stored in the form of an analytical expression.

11. A method for reliable control of a high rotor pole switched reluctance machine (HRSRM) utilizing a sensorless reliable control system, the HRSRM including a rotor and a stator with a plurality of stator phases each having a winding, the method comprising the steps of:
   (a) energizing at least one of the plurality of stator phases at a stator phase energizing module, wherein each of the windings of the rest of the plurality of stator phases is in an open circuit state;
   (b) measuring a current value through the at least one energized stator phase and time taken by the current value to reach a peak value or preset magnitude of current at a current and time measuring module;
   (c) determining a self-inductance value for the at least one energized stator phase at a self-inductance determining module;
   (d) storing the self-inductance value and the current value for each of the plurality of stator phases at a storage module;
   (e) measuring a voltage value across an adjacent un-energized stator phase and time taken by an adjacent un-energized stator phase to attain the voltage value at a voltage and time measuring module;
   (f) determining a mutual inductance value between the at least one energized stator phase and the adjacent un-energized stator phase at a mutual-inductance determining module;
   (g) estimating a rotor position utilizing a hybrid combination of the stored self-inductance and mutual inductance values at a rotor position estimation module; and
   (h) controlling the HRSRM based on the estimated rotor position at a control module.

12. The method of claim 11 wherein the self-inductance value and the current value are stored in a look up table at the storage module.

13. The method of claim 11 wherein the self-inductance value and the current value are stored in a form of an analytical expression at the storage module.

14. The method of claim 11 wherein the mutual-inductance value and the voltage value are stored in a look up table.

15. The method of claim 11 wherein the mutual-inductance value and the voltage value are stored in the form of an analytical expression.

16. A method for reliable control of a high rotor pole switched reluctance machine (HRSRM) utilizing a sensorless reliable control system, the HRSRM including a rotor and a stator with a plurality of stator phases each having a winding, the method comprising the steps of:

(a) energizing at least one of the plurality of stator phases at a stator phase energizing module, wherein each of the windings of the rest of the plurality of stator phases is in an open circuit state;

(b) measuring a first current value through the at least one energized stator phase and time taken by the first current value to reach a first peak value or preset magnitude of current at a first current and time measuring module;

(c) determining a self-inductance value for the at least one energized stator phase at a self-inductance determining module;

(d) storing the self-inductance value and the first current value for each of the plurality of stator phases at a storage module;

(e) measuring a second current value through an adjacent un-energized stator phase and time taken by the adjacent un-energized stator phase to reach a second peak value of current at a second current and time measuring module;

(f) determining a mutual inductance value between the at least one energized stator phase and the adjacent un-energized stator phase at a mutual-inductance determining module;

(g) estimating a rotor position utilizing a hybrid combination of the stored self-inductance and mutual inductance values at a rotor position estimation module; and (h) controlling the HRSRM based on the estimated rotor position at a control module.

17. The method of claim 16 wherein the self-inductance value and the first current value are stored in a look up table at the storage module.

18. The method of claim 16 wherein the self-inductance value and the first current value are stored in a form of an analytical expression.

19. The method of claim 16 wherein the mutual-inductance value and the second current value are stored in a look up table.

20. The method of claim 16 wherein the mutual-inductance value and the second current value are stored in the form of an analytical expression.

* * * * *